(12) United States Patent
Sengul et al.

(10) Patent No.: US 11,506,045 B2
(45) Date of Patent: Nov. 22, 2022

(54) TWO-POINT POLISHED ROD LOAD-SENSING SYSTEM

(71) Applicant: Noven, Inc., Houston, TX (US)

(72) Inventors: Mahmut Sengul, Houston, TX (US); Mario Ruscev, Houston, TX (US)

(73) Assignee: NOVEN, INC., Houston, TX (US)

( * ) Notice: Subject to any disclaimer, the term of this patent is extended or adjusted under 35 U.S.C. 154(b) by 259 days.

(21) Appl. No.: 16/897,639

(22) Filed: Jun. 10, 2020

(65) Prior Publication Data

US 2020/0392832 A1 Dec. 17, 2020

Related U.S. Application Data

(60) Provisional application No. 62/859,938, filed on Jun. 11, 2019.

(51) Int. Cl.
*E21B 47/009* (2012.01)
*G01L 1/22* (2006.01)
*E21B 43/12* (2006.01)

(52) U.S. Cl.
CPC ............ *E21B 47/009* (2020.05); *G01L 1/225* (2013.01); *E21B 43/127* (2013.01)

(58) Field of Classification Search
CPC ....... E21B 43/127; E21B 47/009; G01L 1/22; F04B 2201/121
See application file for complete search history.

(56) References Cited

U.S. PATENT DOCUMENTS

| 2,151,728 | A | * | 3/1939 | Baker ................... G01L 5/0061 |
| | | | | 73/152.59 |
| 3,343,409 | A | | 9/1967 | Gibbs |
| 3,599,479 | A | * | 8/1971 | Kutsay ..................... G01B 7/18 |
| | | | | 73/862.635 |
| 3,635,081 | A | | 1/1972 | Gibbs |
| 4,490,094 | A | | 12/1984 | Gibbs |
| 4,509,901 | A | | 4/1985 | McTamaney et al. |
| 4,644,785 | A | * | 2/1987 | Doyle ................... F04B 47/026 |
| | | | | 73/781 |
| 4,932,253 | A | | 6/1990 | McCoy |
| 5,167,490 | A | | 12/1992 | McKee et al. |
| 5,464,058 | A | * | 11/1995 | McCoy ................. G01L 5/0061 |
| | | | | 417/63 |
| 5,941,305 | A | | 8/1999 | Thrasher et al. |
| 6,176,682 | B1 | | 1/2001 | Mills |
| 6,343,515 | B1 | * | 2/2002 | Dodson ..................... G01L 5/10 |
| | | | | 73/831 |
| 7,634,328 | B2 | | 12/2009 | Medizade et al. |
| 9,080,438 | B1 | * | 7/2015 | McCoy ................. E21B 47/008 |

(Continued)

FOREIGN PATENT DOCUMENTS

WO     2009/005876 A2     1/2009

*Primary Examiner* — Kipp C Wallace
(74) *Attorney, Agent, or Firm* — MH2 Technology Law Group LLP

(57) ABSTRACT

An apparatus includes a first clamping mechanism configured to grip a tubular member at a first location along the tubular member. The apparatus also includes a second clamping mechanism configured to grip the tubular member at a second location along the tubular member that is axially-offset from the first location. The apparatus also includes a base positioned between the first and second clamping mechanisms. The apparatus also includes a strain gauge coupled to the base.

22 Claims, 7 Drawing Sheets

(56) References Cited

U.S. PATENT DOCUMENTS

| | | |
|---|---|---|
| 9,938,076 B2 | 5/2018 | Zhao |
| 11,136,838 B1 * | 10/2021 | Liess .................. G01L 5/16 |
| 2011/0185825 A1 * | 8/2011 | Mackie .................. E21B 47/00 |
| | | 166/381 |
| 2012/0020808 A1 | 1/2012 | Lawson et al. |
| 2015/0142319 A1 * | 5/2015 | McCoy .................. G01L 5/0061 |
| | | 702/9 |
| 2017/0052078 A1 | 2/2017 | Zhao |
| 2017/0159422 A1 | 6/2017 | McCoy |
| 2017/0167482 A1 | 6/2017 | Assad et al. |
| 2018/0136057 A1 | 5/2018 | Zhao |

\* cited by examiner

TWO-POINT POLISHED ROD LOAD-SENSING SYSTEM

CROSS-REFERENCE TO RELATED APPLICATIONS

This application claims priority to U.S. patent application Ser. No. 62/859,938, filed on Jun. 11, 2019, the entirety of which is incorporated by reference herein.

BACKGROUND

Beam pumping is the most widely used type of artificial lift method for oil and gas wells. A beam pump unit typically includes three segments: a surface unit, a rod string, and a subsurface pump. Dynamometer surveys are performed to capture load measurements on the beam pump unit. The load measurements may provide insight into the volumetric efficiency, mechanical integrity, and operating efficiency of the beam pump unit. Dynamometer surveys are typically performed using either a transducer placed on the rod string, or a horseshoe load cell placed between the carrier bar and the polished rod clamp. However, installation of such transducers may be expensive and labor-intensive, and may involve shutting down the beam pump unit for hours or days. Therefore, it would be beneficial to have an improved system and method for capturing relative load measurements on a beam pump unit.

SUMMARY

An apparatus for measuring a load on a beam pump unit is disclosed. The method includes a first clamping mechanism configured to grip a tubular member at a first location along the tubular member. The apparatus also includes a second clamping mechanism configured to grip the tubular member at a second location along the tubular member that is axially-offset from the first location. The apparatus also includes a base positioned between the first and second clamping mechanisms. The apparatus also includes a strain gauge coupled to the base.

In another embodiment, the apparatus includes a body. The body includes a first clamping mechanism configured to grip a rod of a beam pump unit at a first location along the rod. The first clamping mechanism includes a first arm and a second arm. The rod is configured to be received between the first and second arms. The first clamping mechanism also includes a first screw mechanism coupled to the second arm. The first screw mechanism is configured to rotate in a first direction to move toward the first arm and thereby clamp the rod between the first screw mechanism and the first arm. The body also includes a second clamping mechanism configured to grip the rod at a second location along the rod that is axially-offset from the first location. The second clamping mechanism includes a third arm and a fourth arm. The rod is configured to be received between the third and fourth arms. The second clamping mechanism also includes a second screw mechanism coupled to the fourth arm. The second screw mechanism is configured to rotate in the first direction to move toward the third arm and thereby clamp the rod between the second screw mechanism and the third arm. The body also includes a base positioned between the first and second clamping mechanisms. The base has a bore formed at least partially therethrough. The apparatus also includes a strain gauge coupled to the base. The strain gauge is configured to capture voltage measurements while the rod is moving. The strain gauge includes a first portion coupled to a first side of the base, and a second portion coupled to a second, opposing side of the base. The bore is positioned between the first and second portions.

A method for measuring the load on the beam pump unit is also disclosed. The method includes measuring a voltage using an apparatus that is coupled to a rod of a beam pump unit. The apparatus includes a first clamping mechanism configured to grip the rod at a first location along the rod. The apparatus also includes a second clamping mechanism configured to grip the rod at a second location along the rod that is axially-offset from the first location. The apparatus also includes a base positioned between the first and second clamping mechanisms. The apparatus also includes a strain gauge coupled to the base. The strain gauge is configured to measure the voltage while the rod is moving.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

The present disclosure is directed to a system and method for measuring a load on a tubular member. More particularly, the system and method may be configured to measure a (e.g., relative) load on a polished rod of a beam pump unit used in oil and gas wells. The load measurements may provide data about the efficiency and health conditions of a subsurface pump and rod string that are part of the beam pump unit.

Figure 1:
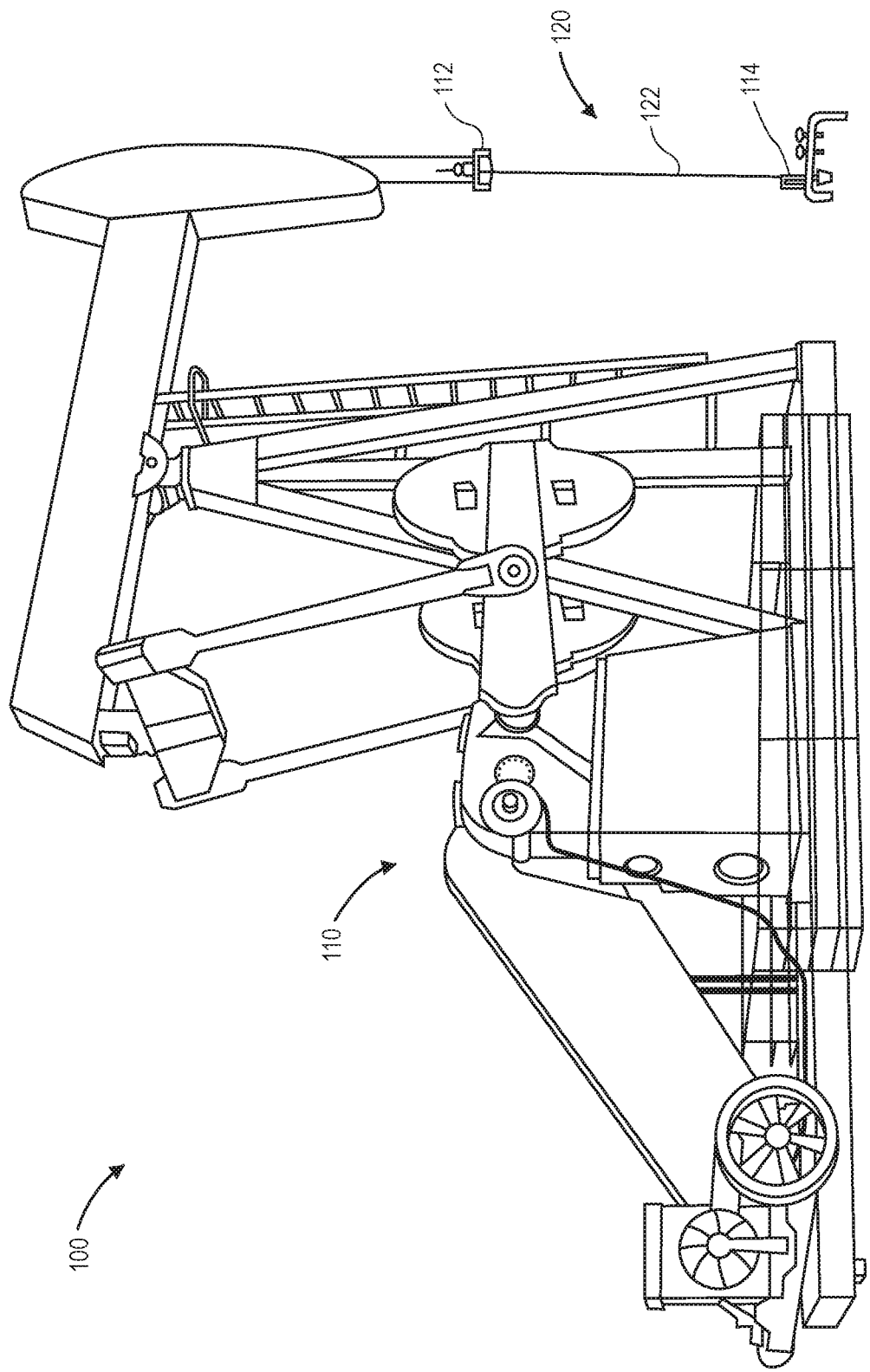
FIG. 1 illustrates a schematic view of a beam pump unit, according to an embodiment.

FIG. 1 illustrates a schematic view of a beam pump unit 100, according to an embodiment. The beam pump unit 100 may include a surface unit 110 that includes a carrier bar 112 and a stuffing box 114. The beam pump unit 100 may also include a rod string 120 that includes a polished rod 122. The polished rod 122 may be positioned at least partially between the carrier bar 112 and the stuffing box 114. The polished rod 122 is configured to cycle up and down a predetermined distance.

Figure 2:
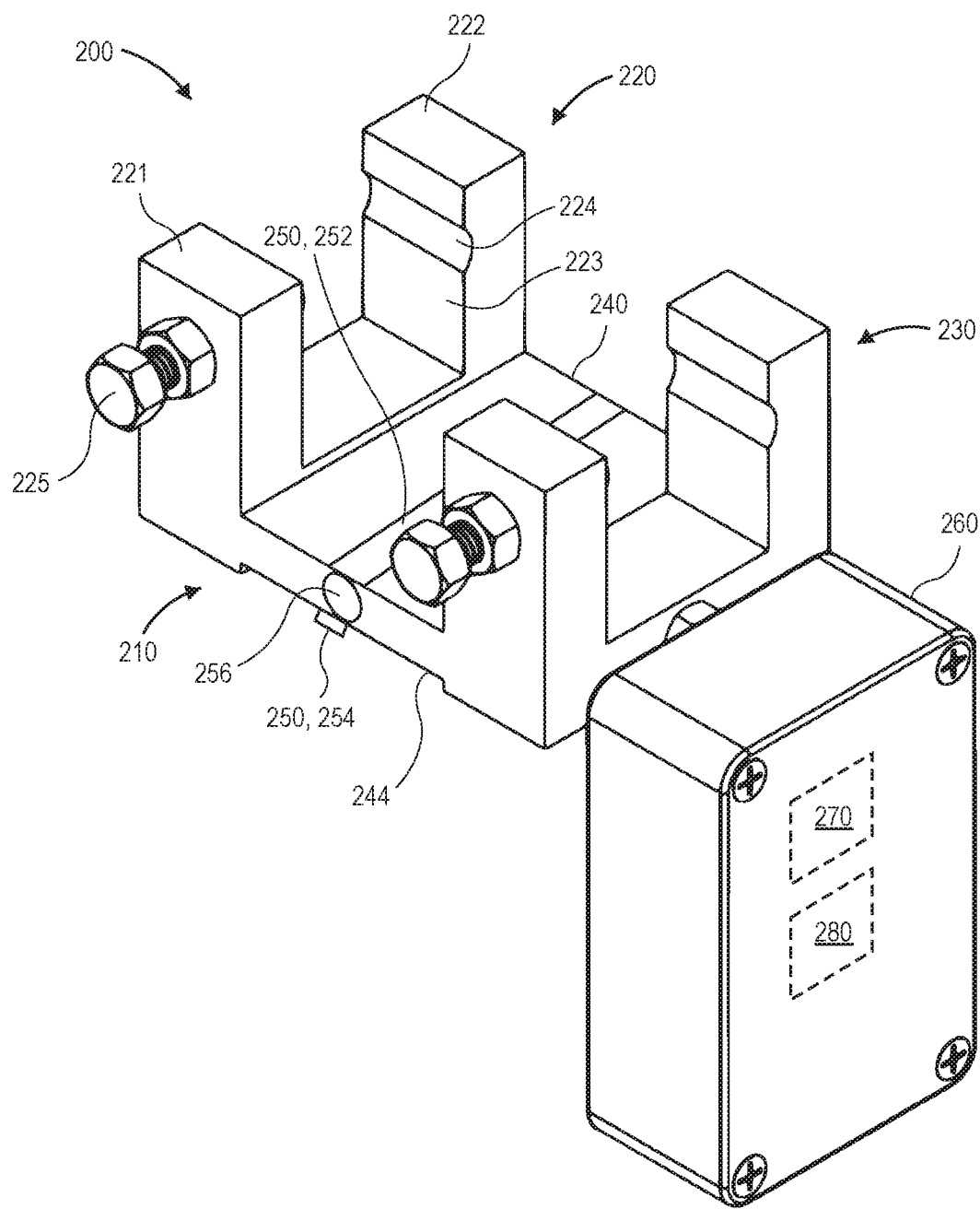
FIG. 2 illustrates a perspective view of an apparatus for measuring a load on a polished rod of the beam pump unit, according to an embodiment.
Figure 3:
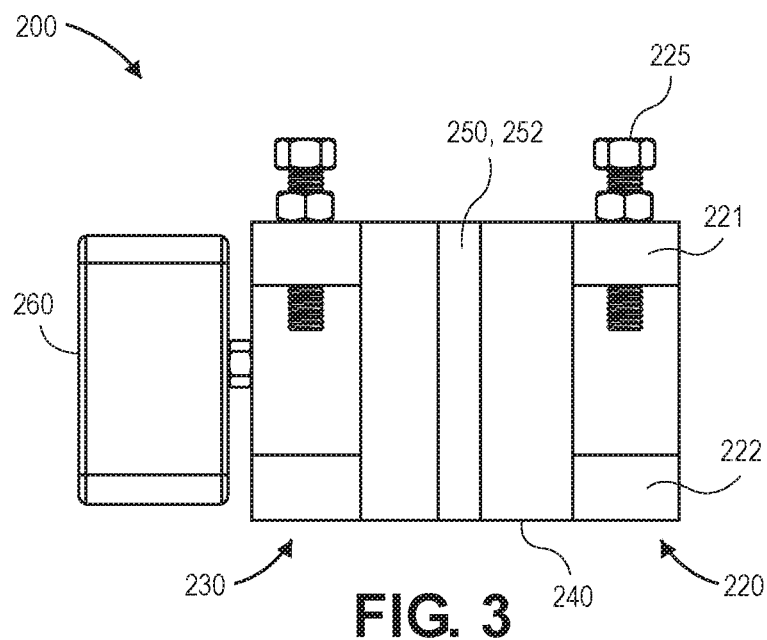
FIG. 3 illustrates a front view of the apparatus of FIG. 2, according to an embodiment.
Figure 4:
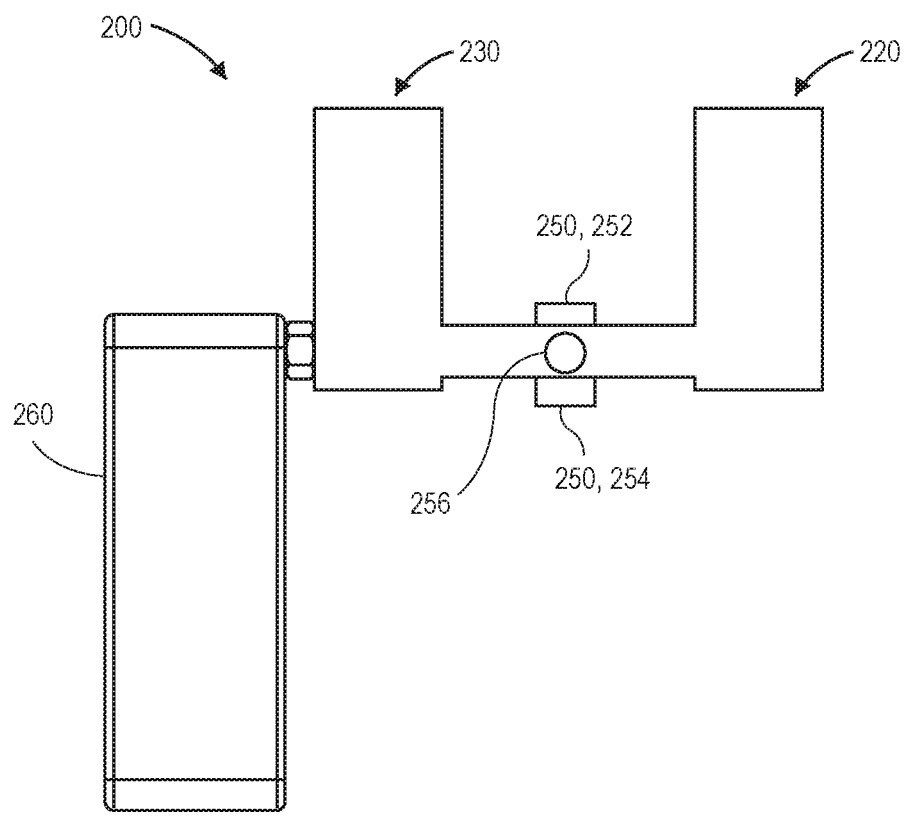
FIG. 4 illustrates a side view of the apparatus of FIG. 2, according to an embodiment.
Figure 5:
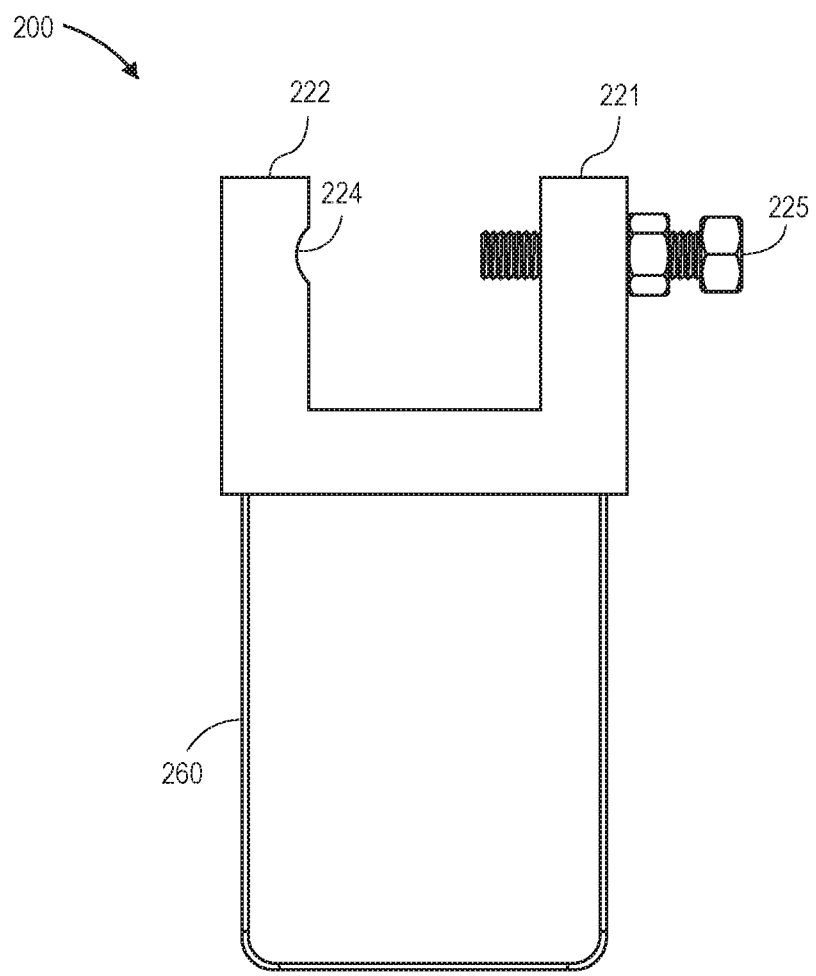
FIG. 5 illustrates a top view of the apparatus of FIG. 2, according to an embodiment.

FIG. 2 illustrates a perspective view of an apparatus 200 for measuring a load on the polished rod 122 of the beam pump unit 100, according to an embodiment. FIGS. 3-5 illustrate a front view, a side view, and a top view of the apparatus 200, according to an embodiment. The apparatus 200 may be configured to be coupled to the polished rod 122 (e.g., between the carrier bar 112 and the stuffing box 114) and to provide dynamometer measurements.

The apparatus 200 may include a body 210. The body 210 may include a first (e.g., upper) clamping mechanism 220, a second (e.g., lower) clamping mechanism 230, and a base 240 positioned between the upper and lower clamping mechanisms 220, 230. The upper clamping mechanism 220 may be coupled to or integral with a first (e.g., upper) end of the base 240 and extend outward therefrom in a direction that is substantially perpendicular to the base 240. The lower clamping mechanism 230 may be coupled to or integral with a second (e.g., lower) end of the base 240 and extend outward therefrom in the same direction as the upper clamping mechanism 220. The upper and lower clamping mechanisms 220, 230 may be configured to clamp (i.e., grip) the polished rod 122 at two different (e.g., axially-offset) points along the polished rod 122. The clamping mechanisms 220, 230 may be installed on (e.g., coupled to) the polished rod 122 without stopping any portion of the beam pump unit 100 during installation. In another embodiment, the polished rod 122 may be stopped for less than 5 minutes to install the clamping mechanisms 220, 230 thereon. For example, a subsurface pump that is in communication with the beam pump unit 100 may continue to operate during the installation. The upper clamping mechanism 220 is described below. The lower clamping mechanism 230 may be the same as or different from the upper clamping mechanism 230.

The upper clamping mechanism 220 may include a first arm 221 and a second arm 222 that are parallel to one another. The upper clamping mechanism 220, the lower clamping mechanism 230, and the base 240 together may have a substantially U-shaped cross-section in a first plane, and the upper clamping mechanism 220 (e.g., including the first arm 221, the second arm 222, and the base 240) may have a substantially U-shaped cross-section in a second plane that is perpendicular to the first plane.

The polished rod 122 may be configured to be positioned between the first and second arms 221, 222. As shown, an inner surface 223 of the first arm 221 may include a curved recess 224 that is sized and shaped to receive the polished rod 122. A screw mechanism 225 may be coupled to the second arm 222. For example, the screw mechanism 225 may extend through the second arm 222. The screw mechanism 225 may move toward the first arm 221 in response to being turned in a first direction, and move away from the first arm 221 in response to being turned in a second, opposing direction. Thus, as will be appreciated, when the polished rod 122 is positioned between the first and second arms 221, 222 (e.g., and seated in the recess 224), the screw mechanism 225 may be turned in the first direction until the screw mechanism 225 contacts the polished rod 122. More particularly, the polished rod 122 may be clamped between the screw mechanism 225 and the first arm 221. The screw mechanism 225 may include a lock to lock the screw mechanism 225 in place when engaged with the polished rod 122. The lock may prevent the screw mechanism 225 from rotating in at least one direction and backing-out of engagement with the polished rod 122.

The apparatus 200 may also include a strain gauge 250. The strain gauge 250 may be coupled to or integral with the base 240 between the upper and lower clamping mechanisms 220, 230. In at least one embodiment, the strain gauge 250 may include a first portion 252 and a second portion 254. The first portion 252 may be coupled to or integral with an inner surface of the base 240 that faces toward the polished rod 122, and the second portion 254 may be coupled to or integral with an outer surface of the base 240 that faces away from the polished rod 122. In at least one embodiment, at least a portion of the outer surface of the base 240 may define a recess 244, and the second portion 254 may be positioned at least partially within and/or coupled to the recessed portion of the outer surface of the base 240.

A bore 256 may be formed at least partially through the base 240 in a direction that is substantially parallel with the screw mechanisms 225. A cross-sectional shape of the bore 256 may be circular. A thickness of the base 240 between the first portion 252 of the strain 250 gauge and the bore 256 may be from about 1 µm to about 1 mm, about 10 µm to about 1 mm, or about 100 µm to about 1 mm. Similarly, the thickness of the base 240 between the second portion 254 of the strain gauge 250 and the bore 256 may be from about 1 µm to about 1 mm, about 10 µm to about 1 mm, or about 100 µm to about 1 mm.

The strain gauge 250 may be or include a sensor whose resistance varies with the applied force/load. The strain gauge 250 converts force, pressure, tension, weight, etc., into a change in electrical resistance that can then be measured and converted into strain. When external forces are applied to a stationary object (e.g., the polished rod 122), stress and strain are the result. Stress is defined as the object's internal resisting forces, and strain is defined as the displacement and deformation that occur. The strain may be or include tensile strain and/or compressive strain, distinguished by a positive or negative sign. Thus, the strain gauge 250 may be configured to measure expansion and contraction of the polished rod 122 under static or dynamic conditions.

The (e.g., absolute) change of length Δl of the polished rod 122 is the difference between a section's length l at the time of the measurement and its original length (i.e., the reference length $l_0$). Thus, $\Delta l = l - l_0$. Strain=Δl/l=% elongation. The strain is caused by an external influence or an internal effect. The strain may be caused by a force, a pressure, a moment, heat, a structural change of the material, or the like. If certain conditions are fulfilled, the amount or value of the influencing quantity can be derived from the measured strain value. Using the apparatus described herein, the strain may be determined without using Poisson's ratio.

The strain gauge 250 may be or include a metallic foil-type strain gauge that includes a grid of wire filament (e.g., a resistor) having a thickness less than or equal to about 0.05 mm, about 0.025 mm, or about 0.01 mm. The wire filament may be coupled (e.g., bonded) directly to the strained surface of the polished rod by a thin layer of epoxy resin. When the load is applied to the polished rod 122, the resulting change in surface length is communicated to the resistor, and the corresponding strain is measured in terms of electrical resistance of the wire filament. The resistance may vary linearly with the strain. The wire filament and the adhesive bonding agent work together to transmit the strain. The adhesive bonding agent may also serve as an electrical insulator between the polished rod and the wire filament.

The measured changes in resistance, and the resulting strain, may be small. As a result, the changes in resistance may not be measured directly. Thus, in one embodiment, the strain gauge 250 may be included in a measurement system where precise determination of the strain gauge's change of resistance is possible.

The apparatus 200 may also include an enclosure 260. The enclosure 260 may be coupled to the body 210. More particularly, the enclosure 260 may be coupled to the upper clamping mechanism 220, the lower clamping mechanism 230, or the base 240. The enclosure 260 may have an electronic circuit 270 and/or a transceiver 280 therein. The electronic circuit 270 may be or include an impedance matching electronic circuit, and the transceiver 280 may be or include a BLUETOOTH® transceiver.

As mentioned above, the strain gauge 250 measures the change in length of at least a portion of the polished rod 122 due to the load variation during the upstroke and/or downstroke of the polished rod 122. The sensed load may be an analog voltage value (e.g., in millivolts), which may be converted to a digital value by an analog-to-digital converter (ADC) in the enclosure 260 (e.g., part of the circuit 270). The digital value may be transmitted to a computing system (e.g., a wellsite gateway) using the transceiver 260. For example, the digital value may be transmitted using BLUETOOTH® very-low-energy (BLE) communication. The data (e.g., digital values representing the change in length) may be time-stamped. The measured changes in length may be converted to load values using a calibration chart/table that is specific to the strain gauge 250. The load values may be used as part of a dynamometer survey. The dynamometer survey may be used to analyze volumetric efficiency of the subsurface pump and/or the well, as well as the mechanical integrity and operating efficiency of the subsurface pump.

Figure 6:
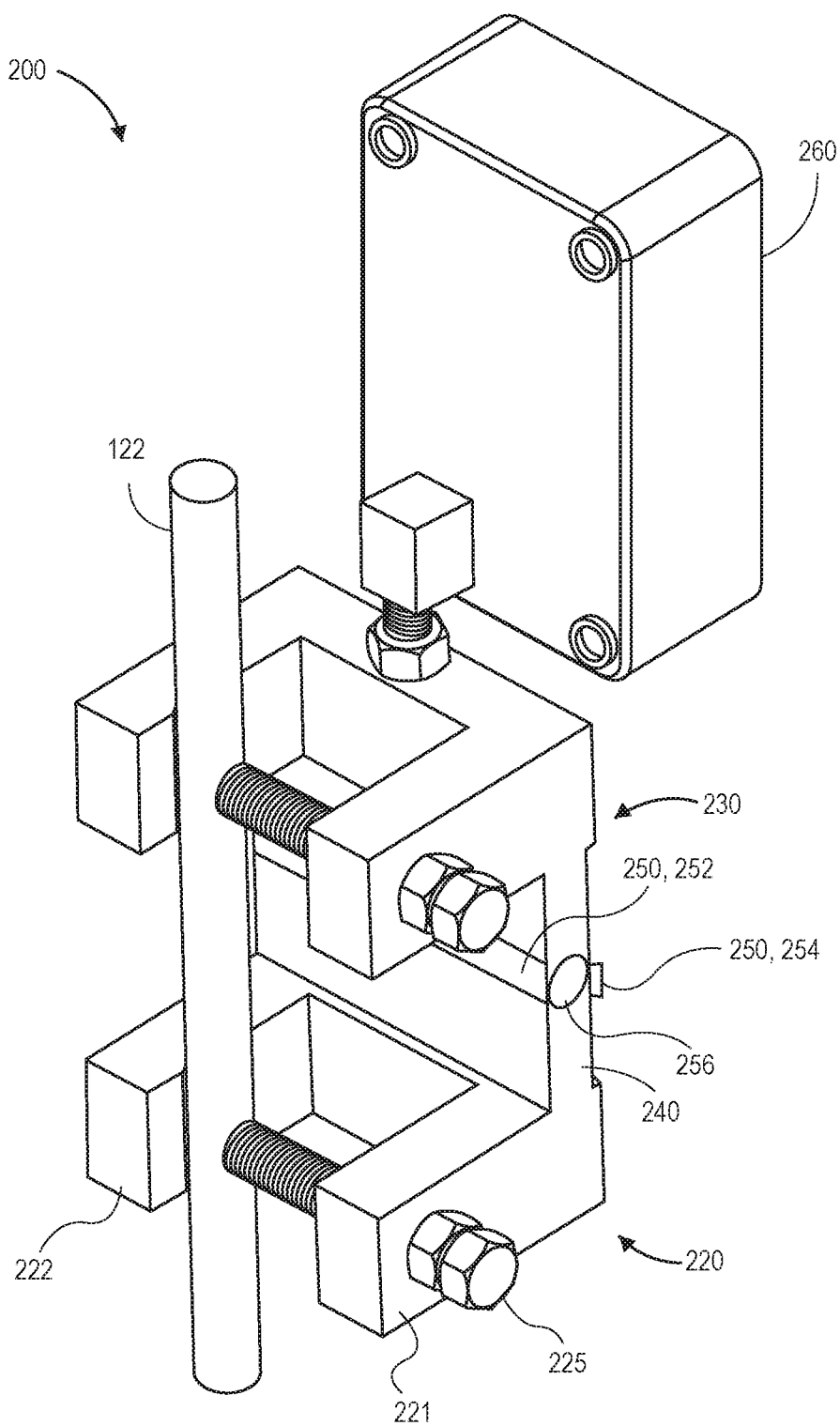
FIG. 6 illustrates a side view of the apparatus measuring the load on the polished rod, according to an embodiment.

FIG. 6 illustrates a side view of the apparatus 200 measuring the load on the polished rod 122, according to an embodiment. As may be seen, the apparatus 200 may be coupled to the polished rod 122 as described above. More particularly, the apparatus 200 may be positioned such that the polished rod 122 is between the arms 221, 222 of the upper clamping mechanism 220 and between the arms of the lower clamping mechanism 230. Then, the screw mechanism 225 may be turned until the polished rod 122 is clamped between the screw mechanism 225 and the second arms 222 of the upper and lower clamping mechanisms 220, 230. In at least one embodiment, the apparatus 200 may be installed while the polished rod 122 is moving (e.g., cycling up and down). Once installed, the strain gauge 250 may capture measurements that may be used to determine the strain on the polished rod 122, as described above.

Figure 7:
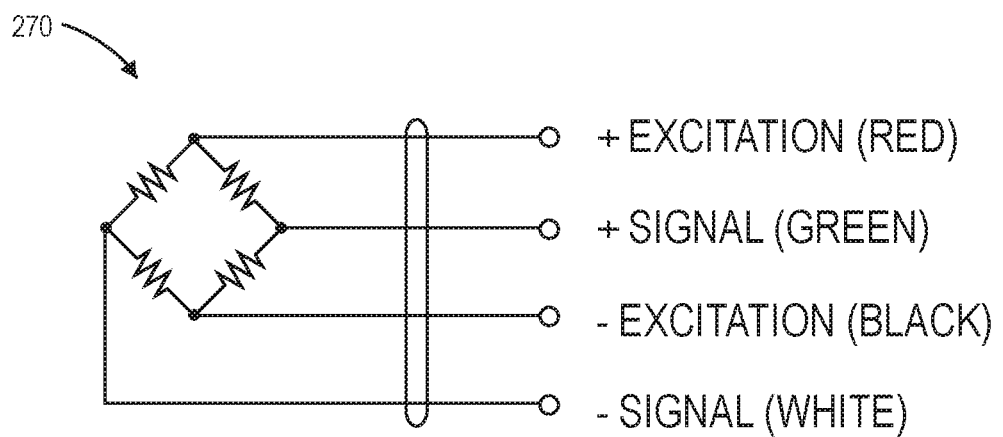
FIG. 7 illustrates a schematic view of a full bridge strain gauge circuit of the apparatus, according to an embodiment.

FIG. 7 illustrates a schematic view of the electronic circuit 270, according to an embodiment. The circuit 270 may be or include a full bridge strain gauge circuit that is positioned in the enclosure 260.

Figure 8:
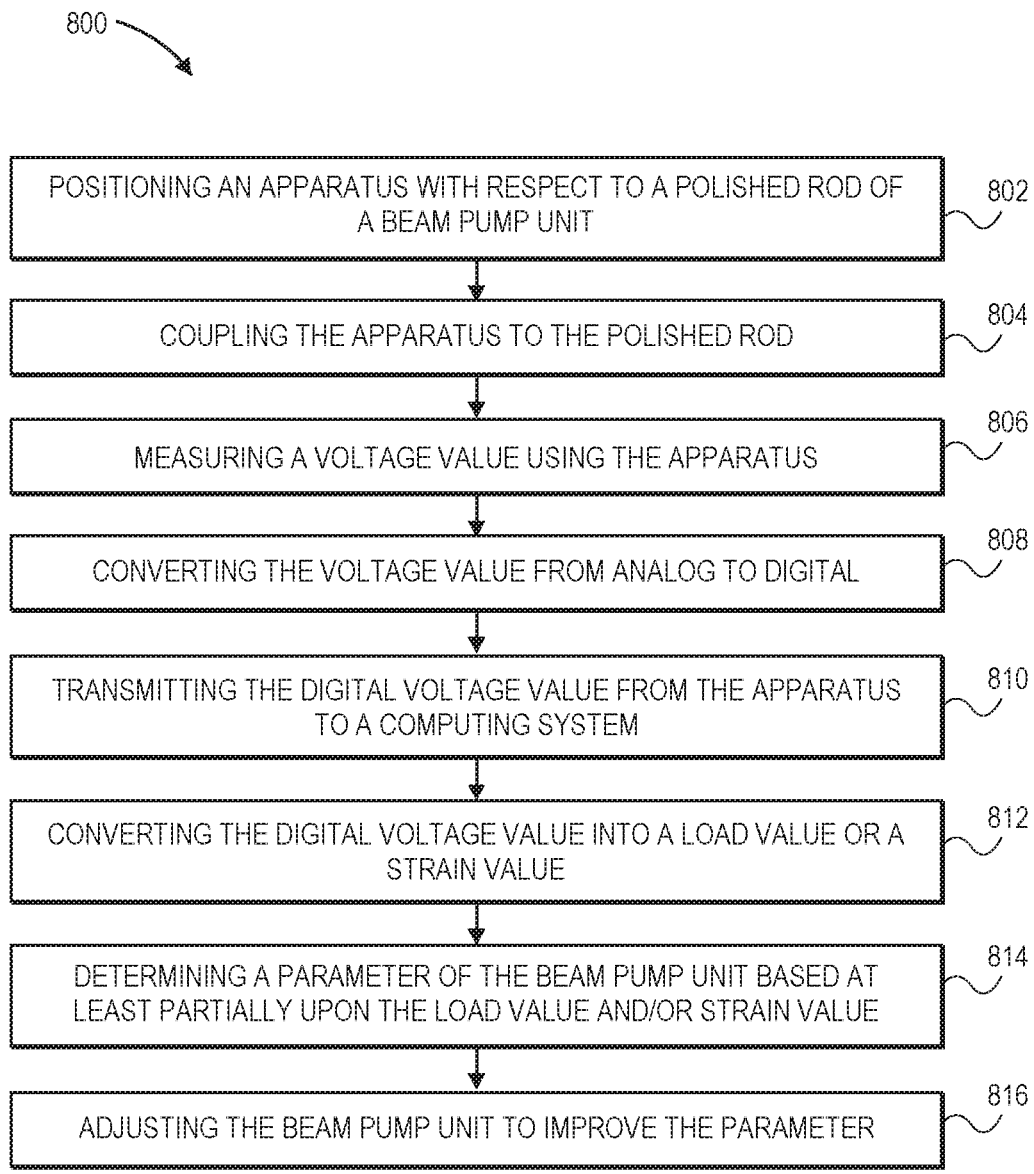
FIG. 8 illustrates a flowchart of a method for determining a load on the polished rod, according to an embodiment.

FIG. 8 illustrates a flowchart of a method 800 for determining a load on the polished rod 122, according to an embodiment. An illustrative order of the method 800 is provided below; however, one or more steps may be performed in a different order, repeated, or omitted.

The method 800 may include positioning the apparatus 200 with respect to the polished rod 122, as at 802. More particularly, this may include positioning the apparatus 200 such that the that the polished rod 122 is between the arms 221, 222 of the upper clamping mechanism 220 and between the arms of the lower clamping mechanism 230. This is shown in FIG. 6. In at least one embodiment, this step may be performed while the polished rod 122 is moving (e.g., cycling up and down). In another embodiment, the polished rod 122 may be stationary.

The method 800 may also include coupling the apparatus 200 to the polished rod 122, as at 804. This may include turning the screw mechanisms 225 until the screw mechanisms 225 contact the polished rod 122, and the polished rod 122 is clamped between the screw mechanisms 225 and the first arms 221. In at least one embodiment, this step may be performed while the polished rod 122 is moving (e.g., cycling up and down). In another embodiment, the polished rod 122 may be stationary.

The method 800 may also include measuring a voltage value using the apparatus 200, as at 806. This step may be performed while the polished rod 122 is moving (e.g., cycling up and down). As discussed above, the movement of the polished rod 122 may cause the length of the polished rod 122 to vary slightly. Because the apparatus 200 is clamped to the polished rod 122 at two axially-offset locations, the length of the apparatus 200 (e.g., the base 240) may also vary in a proportionate amount to polished rod 122. Because the strain gauge 250 is coupled to the apparatus 200, the length of the strain gauge 250 also varies in a proportionate amount to polished rod 122 and the base 240 of the apparatus 200. As the strain gauge 250 varies in length, the resistance of the strain gauge 250 varies. The variation in the resistance causes the voltage value to vary. The voltage value may be analog.

The method 800 may also include converting the voltage value from analog to digital, as at 808. This step may be performed by an ADC in the enclosure 260. For example, the ADC may be part of the circuit 270. In at least one embodiment, this step may be omitted, and the remainder of the method 800 may be performed with analog voltage values.

The method 800 may also include transmitting the digital voltage value from the apparatus 200 to a computing system, as at 810. For example, the transceiver 280 in the enclosure 260 may transmit the digital voltage value to the computing system.

The method 800 may also include converting the digital voltage value into a load value or a strain value, as at 812. This step may be performed by comparing the digital voltage value to a chart that includes corresponding load values and/or strain values. One or more of the foregoing steps may be repeated to obtain a plurality of load values and/or strain values that are captured at different times and during different points in the movement of the polished rod 122. The load value and/or strain value may be part of a dynamometer survey.

The method 800 may also include determining a parameter of the beam pump unit 100 based at least partially upon the load value and/or strain value, as at 814. The parameter may be or include volumetric efficiency, mechanical integrity, and/or operating efficiency of the beam pump unit 100.

The method 800 may also include adjusting the beam pump unit 100 to improve the parameter, as at 816. More particularly, the beam pump unit 100 may be adjusted to improve the volumetric efficiency, mechanical integrity, and/or operating efficiency.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. An apparatus, comprising:
    a first clamping mechanism configured to grip a tubular member at a first location along the tubular member;
    a second clamping mechanism configured to grip the tubular member at a second location along the tubular member that is offset along a longitudinal axis of the tubular member from the first location, wherein the first and second clamping mechanisms each comprise a screw mechanism;
    a base positioned between the first and second clamping mechanisms; and
    a strain gauge coupled to the base, wherein the strain gauge comprises a first portion that is coupled to a recessed portion of an outer surface of the base, and wherein the recessed portion of the base and the first portion of the strain gauge extend parallel to the screw mechanism.

2. The apparatus of claim 1, wherein the first clamping mechanism, the second clamping mechanism, and the base together have a substantially U-shaped cross-section in a first plane, and wherein the first clamping mechanism has a substantially U-shaped cross-section in a second plane that is perpendicular to the first plane.

3. The apparatus of claim 1, wherein the first clamping mechanism comprises first and second arms, and wherein the tubular member is configured to be received at least partially between the first and second arms.

4. The apparatus of claim 3, wherein an inner surface of the first arm defines a recess that is shaped and sized to receive the tubular member.

5. The apparatus of claim 3, wherein the screw mechanism is coupled to the second arm, wherein the screw mechanism is configured to move toward the first arm when rotated in a first direction to clamp the tubular member between the screw mechanism and the first arm.

6. The apparatus of claim 5, wherein the first and second arms extend from the base in a first direction, and wherein the screw mechanism extends in a second direction that is perpendicular to the first direction.

7. The apparatus of claim 1, wherein the strain gauge comprises:
    a second portion coupled to inner surface of the base, wherein the recessed portion and the second portion of the strain gauge extend parallel to the bore and the screw mechanism.

8. The apparatus of claim 7, wherein the base has a bore formed at least partially therethrough, wherein the bore is parallel to the screw mechanism and the first and second portions of the strain gauge, and wherein the bore is positioned between the first and second portions of the strain gauge.

9. The apparatus of claim 8, wherein a thickness of the base between the first portion of the strain gauge and the bore is from about 1 µm to about 1 mm.

10. The apparatus of claim 1, wherein the tubular member comprises a polished rod of a beam pump unit.

11. An apparatus, comprising:
    a body comprising:
        a first clamping mechanism configured to grip a rod of a beam pump unit at a first location along the rod, wherein the first clamping mechanism comprises:
            a first arm;
            a second arm, wherein the rod is configured to be received between the first and second arms; and
            a first screw mechanism coupled to the second arm, wherein the first screw mechanism is configured to rotate in a first direction to move toward the first arm and thereby clamp the rod between the first screw mechanism and the first arm;
        a second clamping mechanism configured to grip the rod at a second location along the rod that is offset along a longitudinal axis of the rod from the first location, wherein the second clamping mechanism comprises:
            a third arm;
            a fourth arm, wherein the rod is configured to be received between the third and fourth arms; and
            a second screw mechanism coupled to the fourth arm, wherein the second screw mechanism is configured to rotate in the first direction to move toward the third arm and thereby clamp the rod between the second screw mechanism and the third arm; and
        a base positioned between the first and second clamping mechanisms, wherein the base has a bore formed at least partially therethrough; and a strain gauge coupled to the base, wherein the strain gauge is configured to capture voltage measurements while the rod is moving, and wherein the strain gauge comprises:
- a first portion coupled to a recessed portion of an outer surface of the base; and
- a second portion coupled to a an inner surface of the base, and wherein the bore is positioned between the first and second portions, and wherein the recessed portion and the first and second portions of the strain gauge extend parallel to the first and second screw mechanisms.

12. The apparatus of claim 11, wherein the bore has a substantially circular cross-sectional shape, and wherein the bore extends in a same direction as the first and second screw mechanisms.

13. The apparatus of claim 12, wherein a thickness of the base between the first portion of the strain gauge and the bore is less than 1 mm, and wherein a thickness of the between the second portion of the strain gauge and the bore is less than 1 mm.

14. The apparatus of claim 13, further comprising:
an enclosure coupled to the body;
a circuit positioned within the enclosure, wherein the circuit is configured to receive the voltage measurements from the strain gauge; and
a transceiver positioned within the enclosure, wherein the transceiver is configured to wirelessly transmit the voltage measurements to a computing system.

15. The apparatus of claim 11, wherein the bore is laterally offset from the rod and the first and second screw mechanisms.

16. The apparatus of claim 11, wherein the first portion extends a same length as the recessed portion.

17. The apparatus of claim 11, wherein the second portion extends a same length as the base.

18. A method, comprising:
measuring a voltage using an apparatus that is coupled to a rod of a beam pump unit, wherein the apparatus comprises:
- a first clamping mechanism configured to grip the rod at a first location along the rod;
- a second clamping mechanism configured to grip the rod at a second location along the rod that is offset along a longitudinal axis of the rod from the first location, wherein the first and second clamping mechanisms each comprise a screw mechanism;
- a base positioned between the first and second clamping mechanisms; and
- a strain gauge coupled to the base, wherein the strain gauge comprises a first portion that is coupled to a recessed portion of an outer surface of the base, wherein the recessed portion and the first portion of the strain gauge extend parallel to the screw mechanism, and wherein the strain gauge is configured to measure the voltage while the rod is moving.

19. The method of claim 18, wherein a length of the rod varies while the rod is moving, which causes a length of the strain gauge to vary proportionately, wherein a resistance of the strain gauge varies in response to the length of the strain gauge varying, and wherein the voltage varies in response to the resistance varying.

20. The method of claim 19, further comprising converting the voltage from an analog voltage value to a digital voltage value using a circuit, wherein the circuit is positioned within an enclosure that is coupled to the first clamping mechanism, the second clamping mechanism, or the base.

21. The method of claim 20, further comprising transmitting the digital voltage value using a transceiver positioned within the enclosure.

22. The method of claim 21, further comprising:
converting the digital voltage value into a corresponding load value for the rod, a corresponding strain value for the rod, or both; and
determining a parameter of the beam pump unit based at least partially upon the load value, the strain value, or both, wherein the parameter is selected from the group consisting of volumetric efficiency, operating efficiency, and mechanical integrity.

* * * * *